US008601443B2

(12) United States Patent
Barker et al.

(10) Patent No.: US 8,601,443 B2
(45) Date of Patent: Dec. 3, 2013

(54) METHOD AND SYSTEM FOR CORRELATING TRACE DATA

(75) Inventors: Kevin Spencer Barker, Raleigh, NC (US); Christopher Shane Claussen, Austin, TX (US); Stefan Georg Derdak, San Jose, CA (US); Xiaochun Mei, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 1206 days.

(21) Appl. No.: 12/029,813

(22) Filed: Feb. 12, 2008

(65) Prior Publication Data

US 2009/0204947 A1  Aug. 13, 2009

(51) Int. Cl.
 *G06F 9/44* (2006.01)
(52) U.S. Cl.
 USPC ........... 717/128; 717/124; 717/127; 717/131; 712/244
(58) Field of Classification Search
 USPC ........................................................ 717/128
 See application file for complete search history.

(56) References Cited

U.S. PATENT DOCUMENTS

| | | | | |
|---|---|---|---|---|
| 5,287,507 A * | 2/1994 | Hamilton et al. | ............. | 719/315 |
| 5,615,351 A * | 3/1997 | Loeb | ................ | 700/90 |
| 6,263,491 B1 * | 7/2001 | Hunt | ............................ | 717/130 |
| 6,385,643 B1 * | 5/2002 | Jacobs et al. | ................. | 709/203 |
| 6,457,143 B1 * | 9/2002 | Yue | ................. | 714/43 |
| 6,526,567 B1 * | 2/2003 | Cobbett et al. | ............... | 717/124 |
| 6,587,888 B1 * | 7/2003 | Chieu et al. | .................. | 719/313 |
| 6,614,781 B1 * | 9/2003 | Elliott et al. | .................. | 370/352 |
| 6,629,123 B1 * | 9/2003 | Hunt | ............................ | 718/106 |
| 6,671,830 B2 * | 12/2003 | Lowell et al. | ................... | 714/39 |
| 6,754,890 B1 | 6/2004 | Berry et al. | .................... | 717/128 |
| 6,802,054 B2 * | 10/2004 | Faraj | ............................ | 717/128 |
| 6,826,748 B1 * | 11/2004 | Hohensee et al. | ............ | 717/130 |
| 6,862,711 B1 * | 3/2005 | Bahrs et al. | ................... | 715/205 |
| 6,981,265 B1 * | 12/2005 | Rees et al. | .................... | 719/313 |
| 7,069,176 B2 | 6/2006 | Swaine et al. | ................ | 702/176 |
| 7,194,664 B1 * | 3/2007 | Fung et al. | ...................... | 714/45 |
| 7,200,588 B1 | 4/2007 | Srivastava et al. | ................ | 707/3 |
| 7,210,118 B2 * | 4/2007 | Hastings | ..................... | 717/100 |
| 7,334,232 B2 * | 2/2008 | Jacobs et al. | .................. | 719/313 |
| 7,499,951 B2 * | 3/2009 | Mueller et al. | ................ | 715/762 |
| 7,516,209 B2 * | 4/2009 | Raghuraman et al. | ........ | 709/224 |

(Continued)

OTHER PUBLICATIONS

Title: Efficient model-driven service brokering using web services, author: K Cheng et al, source: IEEE, dated: Jul. 6, 2004.*

(Continued)

*Primary Examiner* — Chameli Das
(74) *Attorney, Agent, or Firm* — Janaki K. Davda; Konrad, Raynes, Davda & Victor LLP (57) ABSTRACT

A computer program product comprises a computer useable medium. The computer useable medium has a computer readable program such that when the computer readable medium is executed on a computer, the computer is caused to configure a calling interceptor at a service invocation point corresponding to a first component service of a software application to monitor a service invocation made by the first component service of a second component service of the software application, record a first set of correlation data represented by a first correlation indicator into a trace file, record a unique identifier into the trace file, and send the unique identifier to the second component service thought the service invocation.

20 Claims, 6 Drawing Sheets

(56) References Cited

U.S. PATENT DOCUMENTS

| | | | | |
|---|---|---|---|---|
| 7,673,285 | B1* | 3/2010 | Michel et al. | 717/107 |
| 7,904,882 | B2* | 3/2011 | Hinks | 717/120 |
| 7,949,999 | B1* | 5/2011 | Willeford | 717/120 |
| 7,992,133 | B1* | 8/2011 | Theroux et al. | 717/124 |
| 2003/0056199 | A1* | 3/2003 | Li et al. | 717/127 |
| 2003/0056200 | A1* | 3/2003 | Li et al. | 717/128 |
| 2004/0268314 | A1 | 12/2004 | Kollman et al. | 717/128 |
| 2005/0086650 | A1* | 4/2005 | Yates et al. | 717/139 |
| 2005/0183066 | A1* | 8/2005 | Jabori | 717/124 |
| 2005/0251809 | A1* | 11/2005 | Gunduc et al. | 719/310 |
| 2006/0095895 | A1* | 5/2006 | K. | 717/130 |
| 2007/0168979 | A1* | 7/2007 | Kumar et al. | 717/124 |
| 2009/0235325 | A1* | 9/2009 | Dimitrakos et al. | 726/1 |
| 2010/0251263 | A1* | 9/2010 | Coelho et al. | 719/314 |
| 2012/0311023 | A1* | 12/2012 | Ladd et al. | 709/203 |

OTHER PUBLICATIONS

Title: Realising service-oriented architecture through context-based dynamic service invocation, author: Tan, P.S, source: IEEE, dated: 2005.*

Donat, Michael, "Debugging in an Asynchronous World—ACM Queue", Sep. 1, 2003, [online], [Retrieved on Sep. 7, 2012]. Retrieved from the Internet at <URL: http://queue.acm.org/detail.cfm?id=945134>, Total 9 pp.

Douglass, David, "SOA on .NET", [online], posted @ Sunday, Jun. 24, 2007 4:15 PM. Retrieved from the Internet at <Url: http://geekswithblogs.neti.NETonMyMindiarchive/2007/. . . >, Total 14 pp.

Splunk, "Operational Intelligence", [online], Copyright © 2005-2012 Splunk Inc. Retrieved from the Internet at <Url: http://www.splunk.com/>, Total 3 pp.

Wikipedia, "Loose Coupling", [online], last modified on Sep. 14, 2012 at 16:03. Retrieved from the Internet at <URL: http://en.wikipedia.org/wiki/Loose_coupling>, Total 5 pp.

Wikipedia, "Service (Systems Architecture)", [online], last modified on Jul. 13, 2012 at 18:17. Retrieved from the Internet at <Url: http://en.wikipedia.org/wiki/Service_%28Systems_Archi . . . >, Total 3 pp.

Wikipedia, "Service-oriented Architecture", [online], last modified on Aug. 27, 2012 at 07:20. Retrieved from the Internet at <URL: http://en.wikipedia.org/wiki/Service-oriented_architecture>, Total 31 pp.

* cited by examiner

METHOD AND SYSTEM FOR CORRELATING TRACE DATA

BACKGROUND

1. Field

This disclosure generally relates to software development. More particularly, the disclosure relates to problem determination ("PD") for handling software errors.

2. General Background

PD is an approach utilized by software developers to find bugs, i.e., errors, in software code. A current PD methodology utilized to find bugs in a Service Oriented Architecture ("SOA") involves reading output generated by the SOA software. An SOA system can be composed by loosely coupled services. This output is typically provided in a trace file. Tracing is the process of utilizing one or more trace files to debug a software application.

Tracing is generally very useful in PD for a software product. In particular, tracing is helpful in resolving PD customer issues that occur at a customer site. When a problem occurs in a customer environment, software vendors typically do not have the opportunity to perform code level debugging for a variety of reasons. One reason is that there may be a communication barrier, e.g., a firewall sitting in between the application installed at the customer site and the software vendor. Another reason is budgetary in that traveling to the customer for each PD customer issue may be too expensive. Further, customer policy may prevent the vendor from performing code level debugging at the customer site. For example, the customer's data and production may be too sensitive to allow PD in its live system. Accordingly, the software vendor typically relies on gathering trace data from the customer. The trace data generally provides a record of the software product's execution logic. By reading the trace data, the software vendor attempts to determine the problem with the software product.

A set of trace data may be involved in an instance of a business software application. That business software application may potentially span multiple components and systems. For example, a first set of trace data may include all the trace records associated with a particular business transaction for a first person. Further, a second set of trace data may include all the trace records associated with a particular business transaction for a second person. Similar, if not the same, components may be utilized for both of these business transactions. Filtering through all of the trace data to find a complete set of related trace records is helpful in PD.

Java™ Specification Request ("JSR") 47 is a Java™ standard for logging Application Programming Interfaces ("APIs"). In particular, JSR 47 provides several pieces of information, e.g., TimeStamp, ThreadID, and Logger, to assist with correlation of trace data. Utilizing TimeStamp, a determination can be made as to when a trace was logged. Further, ThreadID provides identification of the thread utilized to execute the particular trace. In addition, Logger allows for determining which component, e.g., subsystem of a product, is responsible for the trace. However, these three pieces of data are often insufficient for finding a set of related trace data associated with a specific business transaction.

In particular, when work for the related trace data is spread across multiple hardware devices, JSR 47 data is insufficient to correlate the related trace data. This insufficiency stems from the clocks on the different hardware devices being different. Accordingly, the TimeStamp for a first trace data record on one machine may be very different than a second trace data record on a different machine. Further, the ThreadIDs are likely to be different given that each device will likely assign a different ThreadID.

Further, JSR 47 data is not helpful in a situation where multiple inbound events are received over time to participate in the work. An example of an initial inbound event is a business transaction requesting an initial set of information from the customer, and an example of a subsequent inbound event is the business transaction requesting a subsequent set of information from the customer. In other words, JSR 47 may be helpful for one inbound event that initiates the work, but does not address how to correlate subsequent inbound events with the initial inbound event. The ThreadID will likely be different for a subsequent inbound event than the initial inbound event. In JSR 47, any algorithms that create a unique identifier ("ID") for inbound events will not be provided with a trace record that contains the correlation from the current ID to the ID that is being merged into.

In addition, the insufficiency of JSR 47 is also problematic in an asynchronous environment. During each asynchronous step, a new thread can possibly be created and the work can be transferred to a different device. Therefore, the ThreadID of JSR 47 may not gather a complete set of trace data records for a business transaction in an asynchronous environment.

Accordingly, current approaches are not sufficient in correlating trace data in a SOA. When work for a business transaction is performed across multiple computers, multiple threads are utilized for the same business transaction. One thread may be created for a first portion of the business transaction on a particular system whereas a second thread may be created for a second portion of the business transaction on a different system. Current approaches are only helpful for PD in the processing of single threads for a business transaction, which occurs on the same computer. These current approaches are deficient for PD in a multithreaded business transaction spanning multiple computers.

SUMMARY

In one aspect of the disclosure, a computer program product comprises a computer useable medium. The computer useable medium has a computer readable program such that when the computer readable medium is executed on a computer, the computer is caused to configure a calling interceptor at a service invocation point corresponding to a first component service of a software application to monitor a service invocation made by the first component service of a second component service of the software application, record a first set of correlation data represented by a first correlation indicator into a trace file, record a unique identifier into the trace file, and send the unique identifier to the second component service through the service invocation. Further, the computer is caused to configure a callee interceptor at a service invocation point corresponding to a second component service of the software application to monitor the service invocation made by the first component service of the second component service of the software application, record a second set of correlation data represented by a second correlation indicator into the trace file, obtain the unique identifier from the service invocation, and record the unique identifier into the trace file. In addition, the computer is caused to correlate trace data from the first component service and the second component service based on the first correlation indicator, the second correlation indicator, and the unique identifier.

In another aspect of the disclosure, a process is provided. The process configures a calling interceptor at a service invocation point corresponding to a first component service of a software application to monitor a service invocation made by the first component service of a second component service of the software application, record a first set of correlation data represented by a first correlation indicator into a trace file, record a unique identifier into the trace file, and send the unique identifier to the second component service through the service invocation. Further, the process configures a callee interceptor at a service invocation point corresponding to a second component service of the software application to monitor the service invocation made by the first component service of the second component service of the software application, record a second set of correlation data represented by a second correlation indicator into the trace file, obtain the unique identifier from the service invocation, and record the unique identifier into the trace file. In addition, the process correlates trace data from the first component service and the second component service based on the first correlation indicator, the second correlation indicator, and the unique identifier.

In yet another aspect of the disclosure, a system is provided. The system has a calling interceptor positioned at a service invocation point corresponding to a first component service of a software application that monitors a service invocation made by the first component service of a second component service of the software application, records a first set of correlation data represented by a first correlation indicator into a trace file, records a unique identifier into the trace file, and sends the unique identifier to the second component service through the service invocation. Further, the system has a callee interceptor positioned at a service invocation point corresponding to a second component service of the software application that monitors the service invocation made by the first component service of the second component service of the software application, records a second set of correlation data represented by a second correlation indicator into the trace file, obtains the unique identifier from the service invocation, and records the unique identifier into the trace file. In addition, the system has a correlation module that correlates trace data from the first component service and the second component service based on the first correlation indicator, the second correlation indicator, and the unique identifier.

DRAWINGS

The above-mentioned features of the present disclosure will become more apparent with reference to the following description taken in conjunction with the accompanying drawings wherein like reference numerals denote like elements and in which.

DETAILED DESCRIPTION

An interceptor is provided to monitor service invocations in an SOA. The interceptor can be introduced into an existing system without change the execution logic of the SOA application in the existing system. For each service invocation, the interceptor writes data to a trace file as a correlation point. The correlation point can be utilize by a user or a tooling utility, which reads and consumes the trace file, to correlate traces generated from different components.

In one embodiment, a caller interceptor is introduced into the caller system. The caller interceptor will dump its own correlation point. Further, a callee interceptor may be introduced into the callee system. The caller interceptor may pass correlation point information to the callee interceptor. Further, the callee interceptor can dump its correlation point based on what it receives from the caller interceptor. In addition, a user interface ("UI") or a graphical user interface ("GUI") may be utilized to view the correlation traces from different servers together.

Accordingly, traces generated from different components with a specific flow and specific service invocation can be aligned. Therefore, traces will be more easily understood and more useful for PD.

Further, providing the ability to correlate traces from different servers together can be very useful for complex mission critical systems that are deployed in a network environment. In this type of deployment, multiple servers are utilized to guarantee load balance and high availability. Therefore, an event could flow from one server to another and back. Correlating traces from different servers together can help PD in this type of complex environment.

Figure 1:
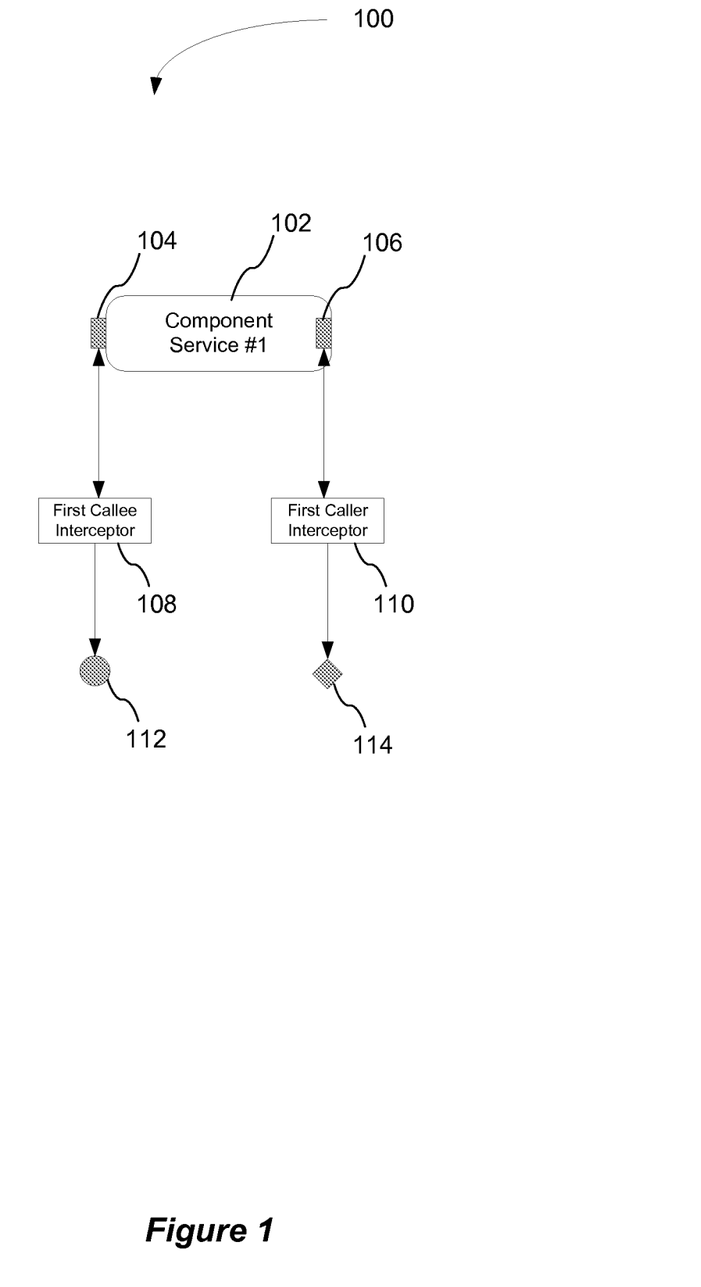
FIG. 1 illustrates a runtime component that is utilized to intercept service invocation and dump a correlation point.

FIG. 1 illustrates a runtime component 100 that is utilized to intercept service invocation and dump a correlation point. A first service component 102 may have one or more first interfaces 104. The first interface 104 is a set of published functionality that other services can invoke. Further, the first service component 102 may have one or more first references 106. The first service component 102 may invoke other services for certain functions. Accordingly, the first reference 106 describes the other service that the first service component 102 is going to invoke.

As an SOA software application includes loosely coupled services, the invocation of a service is monitorable. A first caller interceptor 110 is added at the reference 106 to monitor a service invocation made by the first service component 102 of another service and dump a first set of correlation data, represented by a first correlation indicator 112, into a trace file. Further, a first callee interceptor 108 is added to the first interface 104 to monitor a service invocation made by another service of the first service component 102 and dump a second set of correlation data, represented by a second correlation indicator 114, into a trace file. The correlation data gathered from both of these interceptors is utilized as a base to correlate traces from other components together with traces from the first service component 102.

Figure 2:
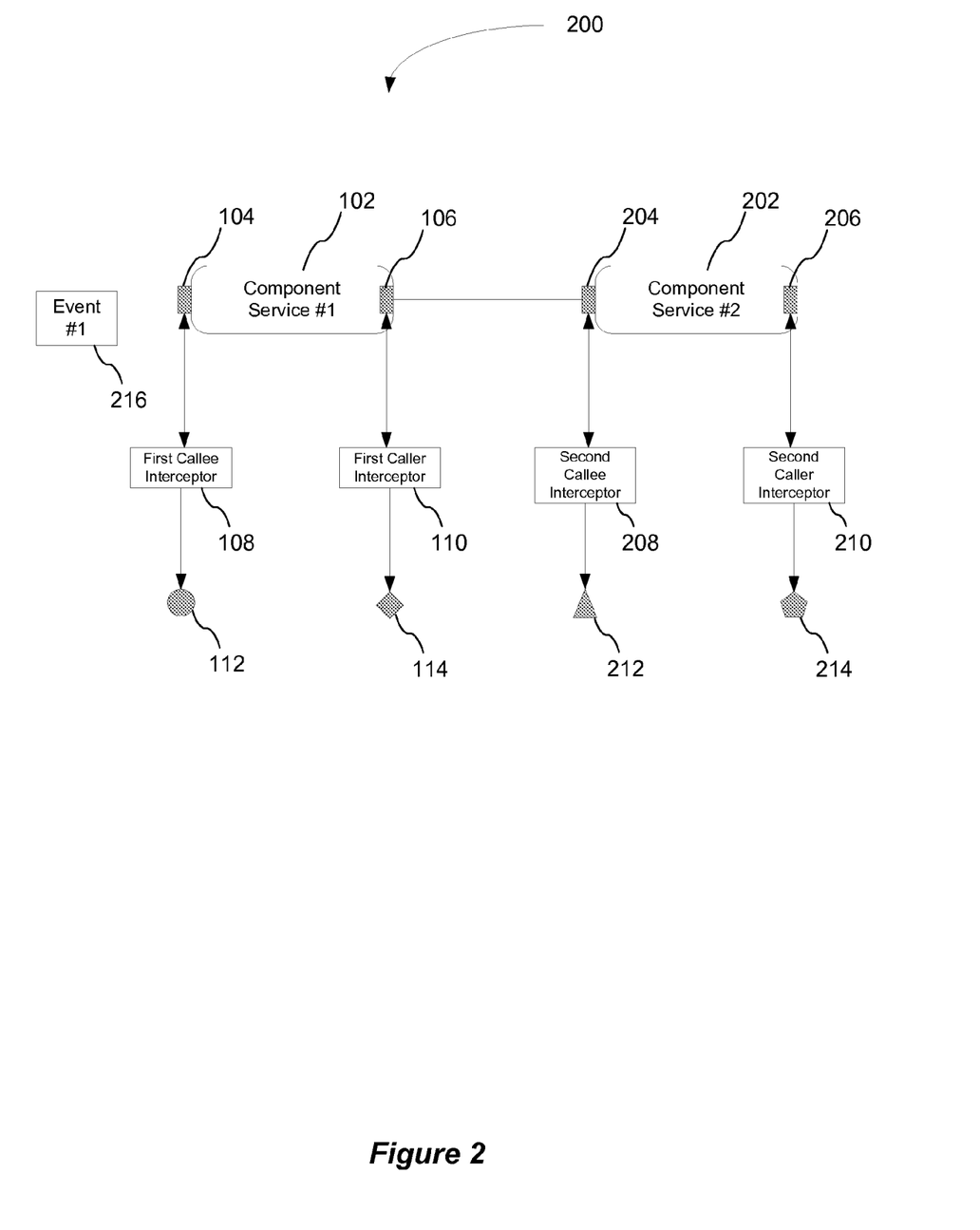
FIG. 2 illustrates a synchronous system that includes a plurality of runtime components.

FIG. 2 illustrates a synchronous system 200 that includes a plurality of runtime components. The system 200 includes the first service component 102, which interacts with a second service component 202. The second service component 202 may have one or more second interfaces 204. Further, the second service component 202 may have one or more second references 206. In addition, a second caller interceptor 210 added at the reference 206 to monitor a service invocation made by the second service component 202 of another service and dump a third set of correlation data, represented by a third correlation indicator 212, into a trace file. Further, a second callee interceptor 208 is added to the second interface 204 to monitor a service invocation made by another service of the second service component 202 and dump a fourth set of correlation data, represented by a fourth correlation indicator

214, into a trace file. As an example, a first event 216 may be received, and the first service component 102 may utilize the first reference 106 to invoke a service published in the second interface 204 of the second service component 202.

In an SOA application, each service is executed by only one thread and service-to-service invocation is synchronous. In the example, one event is received. Accordingly, only trace ID is in the trace file. Accordingly, the trace file can be divided into categories such that each category is utilized for a particular invocation point. In one embodiment, a trace analyzer may then be utilized to correlate traces from the different components based on the different correlation indicators.

Figure 3:
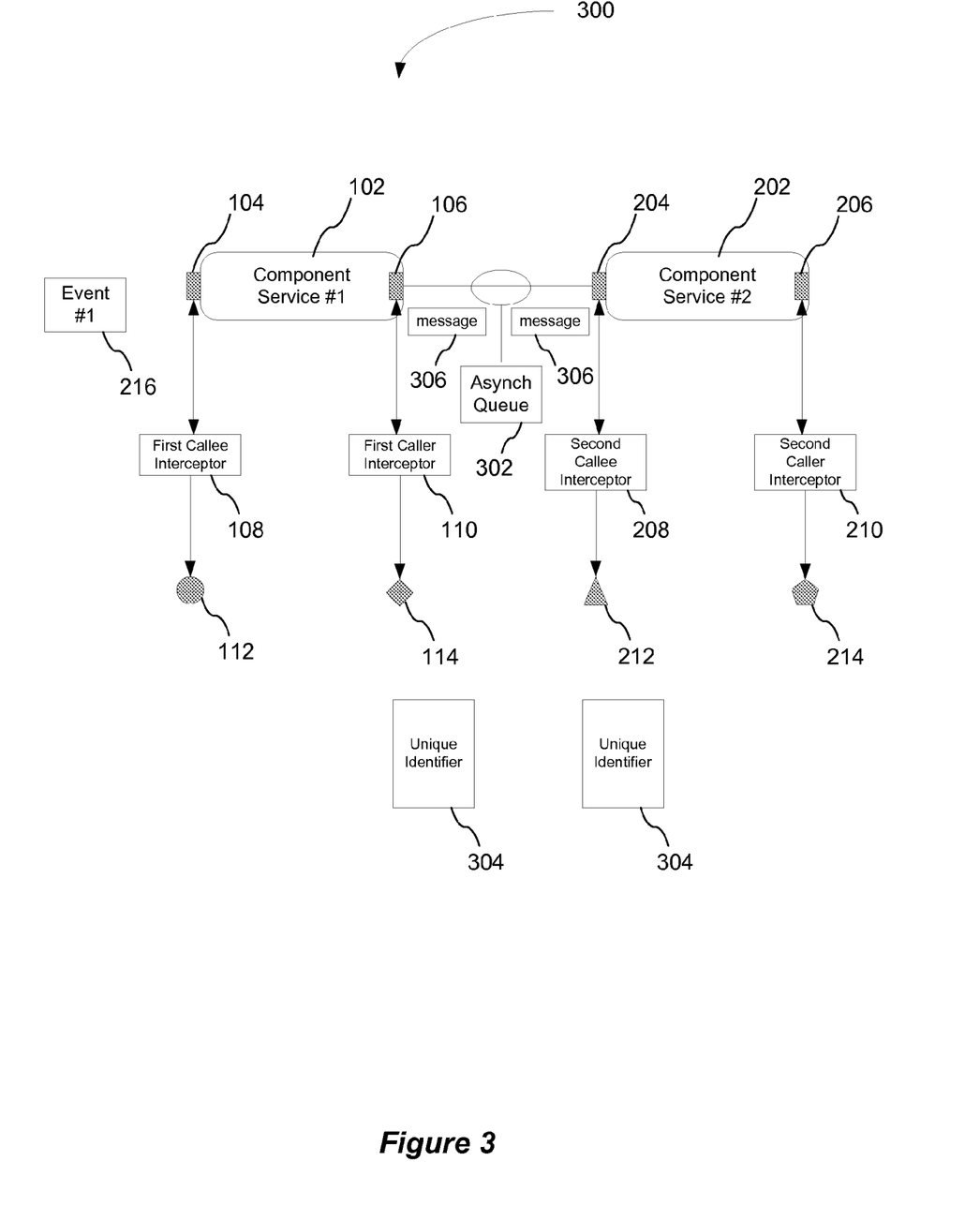
FIG. 3 illustrates an asynchronous system that includes the plurality of runtime components shown in FIG. 2.

FIG. 3 illustrates an asynchronous system 300 that includes the plurality of runtime components shown in FIG. 2. As the asynchronous system 300 allows for an asynchronous call between the first service component 102 and the second service component 202 through an asynchronous queue 302, more than one thread may be utilized for a particular event such as the first event 216. In other words, at least one thread may be utilized by the caller of the asynchronous invocation and at least one thread may be utilized by the callee of the asynchronous invocation. The asynchronous call may be sent through a message 306.

A unique ID 304 is provided at the first caller interceptor 110. Further, the unique ID 304 is written out to the trace file at the caller side of the first service component 102. In addition, the unique ID is passed to the second service component 202. The second callee interceptor 208 can then obtain the unique ID 304 out of the invocation. Further, the second callee interceptor 208 dumps the unique ID 304 into a trace file at the callee side of the second service component 202. In one embodiment, the unique ID 304 is provided in the message 306 from the first service component 102 making the call to the second service component 202 so that content flow between the first service component 102 and the second service component 202 does not have to be changed to handle the unique ID 304. Accordingly, the unique ID allows the correlation of two different threads, e.g. a first thread utilized for the caller and a second thread utilized for the callee, together for the same event.

Although different threads with different Thread IDs may be utilized in the asynchronous system 300, the first caller interceptor 110 and the second callee interceptor 208 both place the unique ID 304 in trace files as the different service components so that the service components can be linked together to correlate the trace date for a particular transaction. Therefore, finding all the trace data in different threads across multiple components in a large complex system with many components is simplified.

The unique ID 304 may be provided the first caller interceptor 110. In an alternative embodiment, the unique ID 304 is generated by the caller service component, e.g., the first service component 102. Various methodologies for generating unique IDs may be utilized. For example, the unique ID 304 may be randomly generated by a random number generator. Additional information such as a machine's internet protocol ("IP") and/or timestamp may be appended to the random number to create the unique ID 304.

In one embodiment, the same methodology may be utilized if the first service component 102 is stored on a first server and the second service component 202 is stored on a second server. A message can be transmitted from the first server to the second server when the first service component 102 calls the second service component 202. The message can include the unique ID 304.

Figure 4:
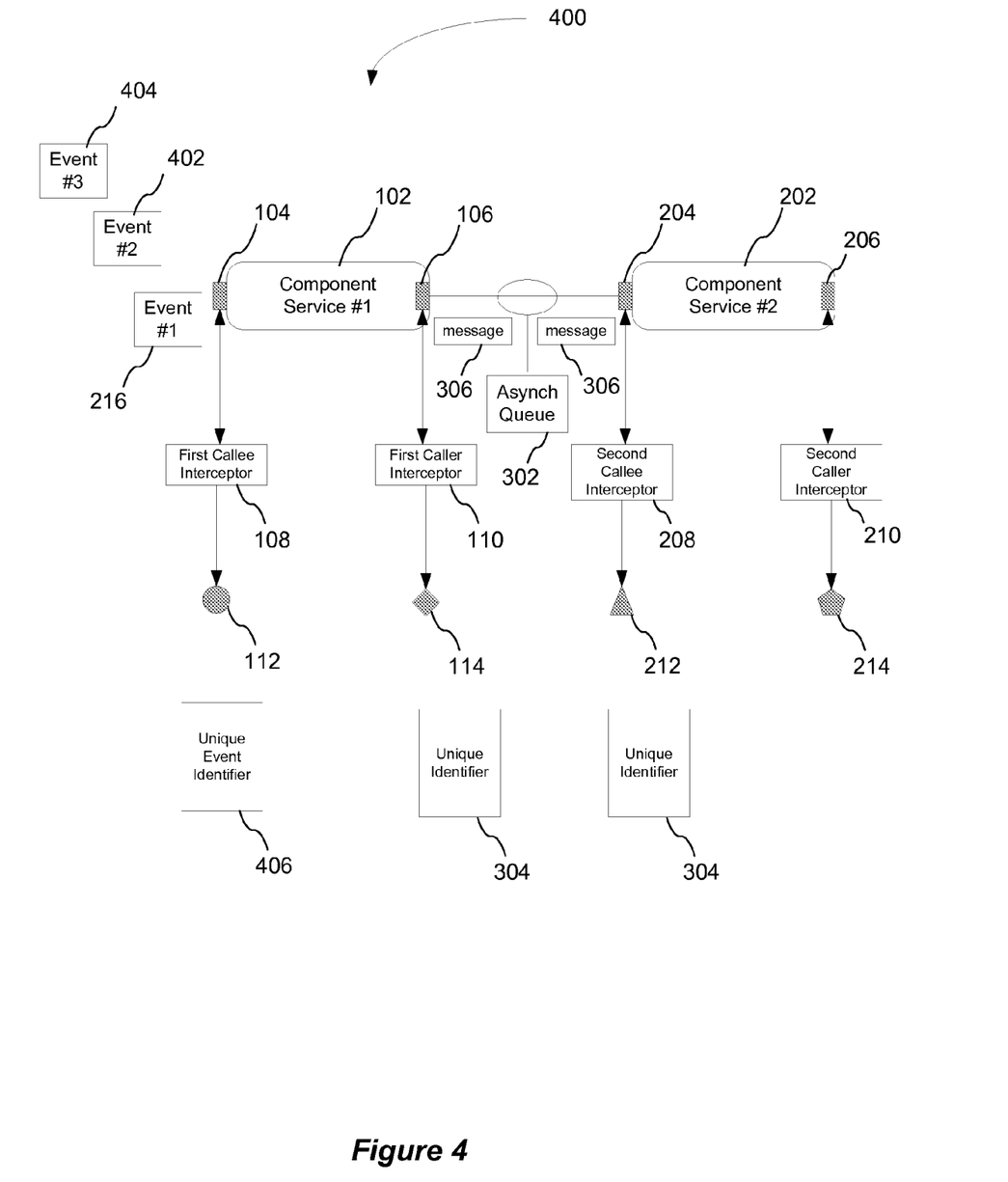
FIG. 4 illustrates the asynchronous system shown in FIG. 3 configured to process multiple events.

FIG. 4 illustrates the asynchronous system 300 shown in FIG. 3 configured to process multiple events. Accordingly, a trace file may have traces from more than one thread utilized to process these multiple events. For example, the asynchronous system 300 may process a first event 216, a second event 402, and a third event 404. As an example, a first thread and a second thread may be utilized to process the first event 216. Further, the first thread may be utilized to process the third event 404.

A unique event ID 406 is provided for each of these events. A dump of the unique event ID 406 is added at the beginning of the process. As a result, the unique identifier 304 provides correlation for trace data, and the unique event ID 406 provides correlation for that trace data for a particular event.

In one embodiment, a tooling module can be provided to parse and/or interpret traces based on the configurations discussed above. The tooling module can display the correlated trace data for a particular transaction on a UI or GUI to assist in PD.

Figure 5:
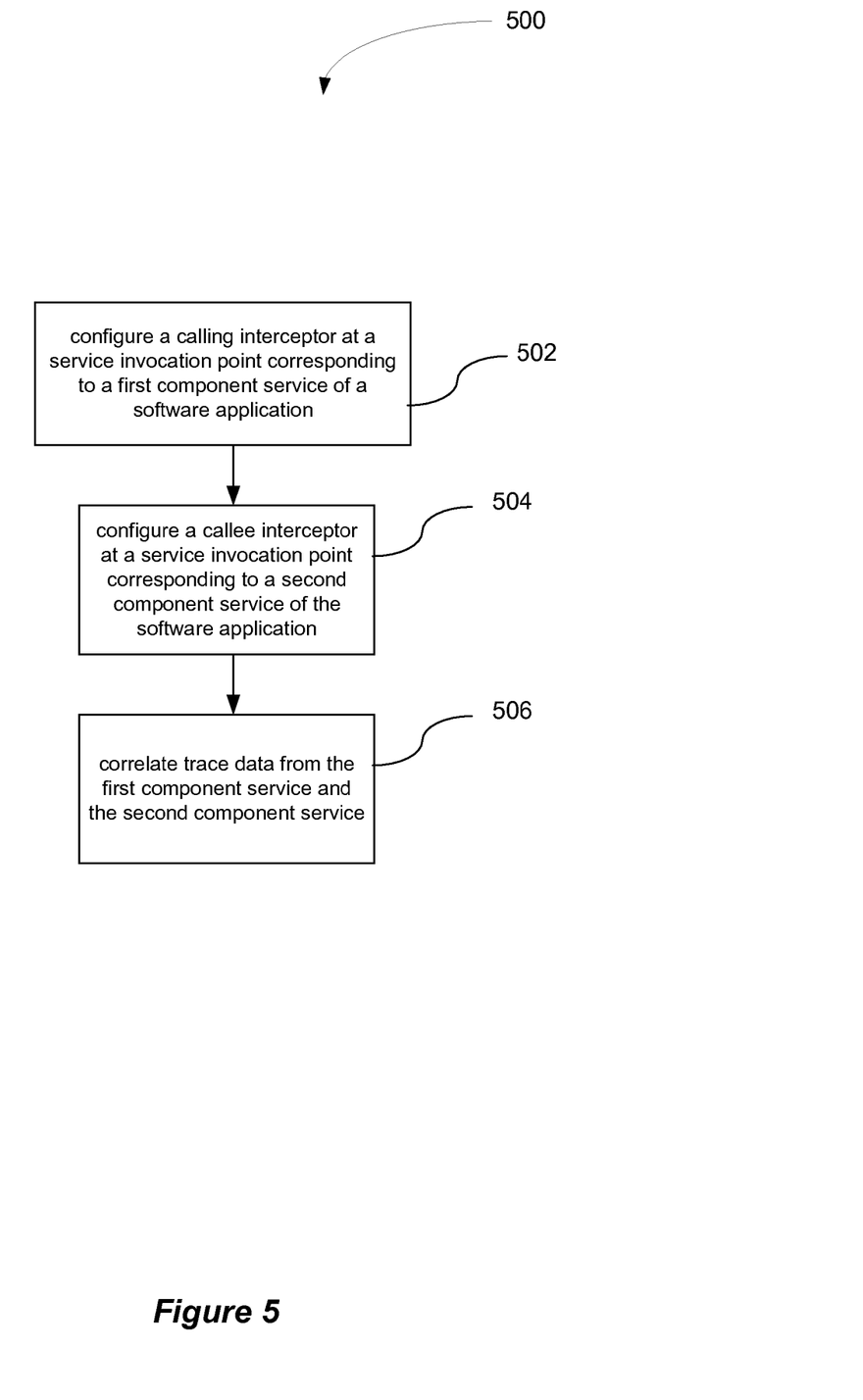
FIG. 5 illustrates a process that may be utilized to correlate trace data.

FIG. 5 illustrates a process 500 that may be utilized to correlate trace data. At a process block 502, the process 500 configures a calling interceptor at a service invocation point corresponding to a first component service of a software application. The calling interceptor monitors a service invocation made by the first component service of a second component service of the software application, records a first set of correlation data represented by a first correlation indicator into a trace file, record a unique identifier into the trace file, and sends the unique identifier to the second component service through the service invocation. Further, at a process block 504, the process 500 configures a callee interceptor at a service invocation point corresponding to a second component service of the software application to monitor the service invocation made by the first component service of the second component service of the software application. The call interceptor records a second set of correlation data represented by a second correlation indicator into the trace file, obtains the unique identifier from the service invocation, and records the unique identifier into the trace file. Finally, at a process block 506, the process 500 correlates trace data from the first component service and the second component service based on the first correlation indicator, the second correlation indicator, and the unique identifier.

Figure 6:
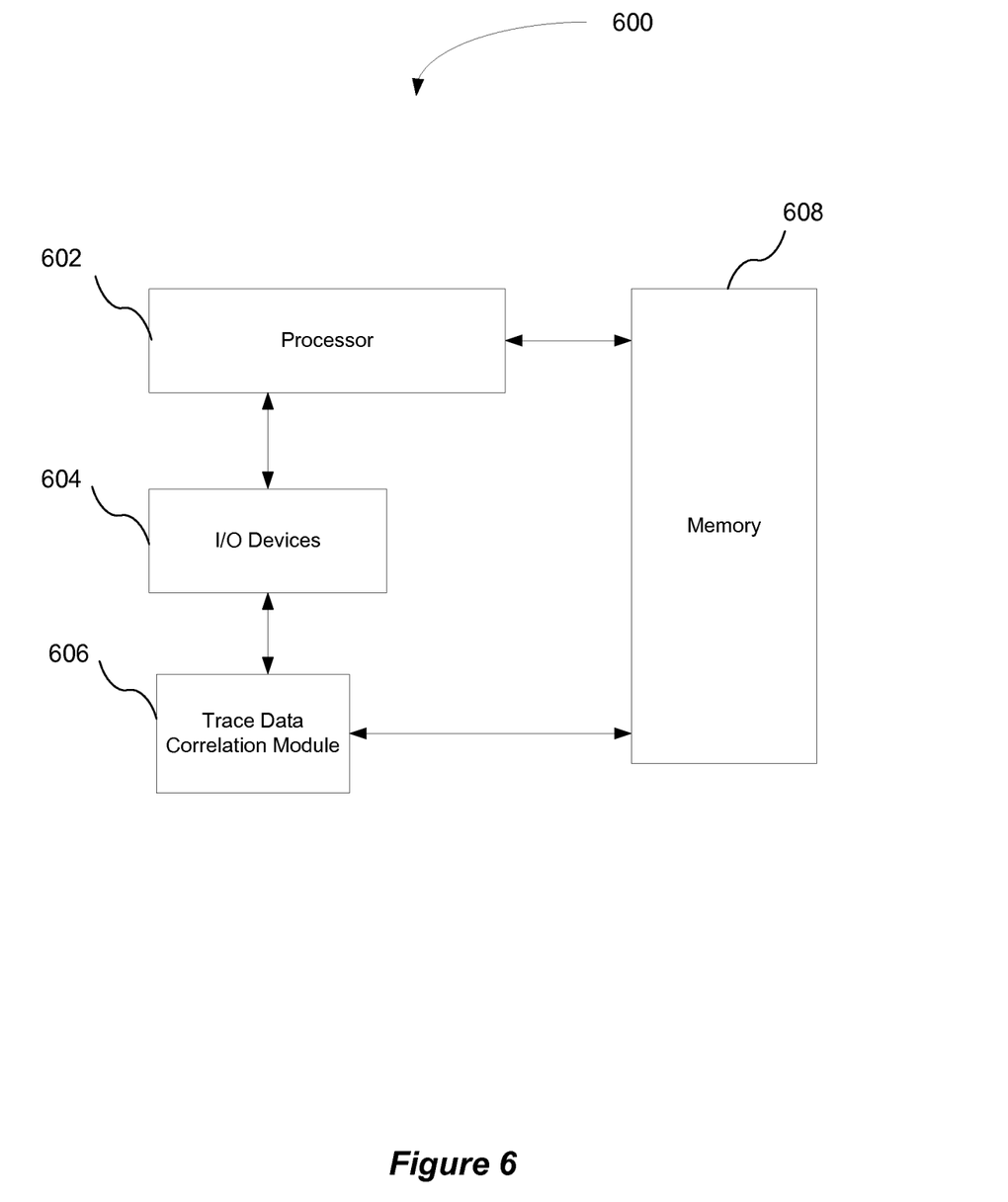
FIG. 6 illustrates a block diagram of a system that utilizes trace data correlation.

FIG. 6 illustrates a block diagram of a system 600 that utilizes trace data correlation. In one embodiment, the system 600 is suitable for storing and/or executing program code and is implemented using a general purpose computer or any other hardware equivalents. Thus, the system 600 comprises a processor 602, a memory 608, e.g., random access memory ("RAM") and/or read only memory ("ROM"), a trace data correlation module 606, and various input/output devices 604.

The processor 602 is coupled, either directly or indirectly, to the memory 608 through a system bus. The memory 608 can include local memory employed during actual execution of the program code, bulk storage, and/or cache memories which provide temporary storage of at least some program code in order to reduce the number of times code must be retrieved from bulk storage during execution.

The input/output devices 604 can be coupled directly to the system 600 or through intervening input/output controllers. Further, the input/output devices 604 can include a keyboard, a keypad, a mouse, a microphone for capturing speech commands, a pointing device, and other user input devices that will be recognized by one of ordinary skill in the art. Further, the input/output devices 604 can include a receiver, transmitter, speaker, display, image capture sensor, biometric sensor, etc. In addition, the input/output devices 604 can include storage devices such as a tape drive, floppy drive, hard disk drive, compact disk ("CD") drive, etc.

Network adapters may also be coupled to the system 600 to enable the system 600 to become coupled to other systems, remote printers, or storage devices through intervening private or public networks. Modems, cable modems, and Ethernet cards are just a few of the currently available types of network adapters.

It should be understood that the method and system described herein can take the form of an entirely hardware embodiment, an entirely software embodiment, or an embodiment containing both hardware and software elements. If software is utilized to implement the method or system, the software can include but is not limited to firmware, resident software, microcode, etc.

Further, the method and/or system can take the form of a computer program product accessible from a computer-usable or computer-readable medium providing program code for use by or in connection with a computer or any instruction execution system. For the purpose of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a RAM, a ROM, a rigid magnetic disk and an optical disk. Current examples of optical disks include CD-read only memory ("CD-ROM"), CD-read/write ("CD-R/W") and DVD.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

We claim:

1. A computer program product comprising a non-transitory computer useable storage device having a computer readable program stored thereon, wherein the computer readable program when executed on a computer causes the computer to:
    configure a calling interceptor at a first component service to monitor a first service invocation made by the first component service to a second component service, record first data represented by a first correlation indicator and an identifier into a trace file, and send the identifier to the second component service, wherein a callee interceptor at the second component service records second data represented by a second correlation indicator and the identifier into the trace file;
    configure a callee interceptor at the first component service to monitor a second service invocation made by the second component service to the first component service and record third data represented by a third correlation indicator into the trace file; and
    correlate the first data, the second data, and the third data in the trace file based on the first correlation indicator, the second correlation indicator, the third correlation indicator, and the identifier.

2. The computer program product of claim 1, wherein at least one of the first service invocation and the second service invocation is asynchronous.

3. The computer program product of claim 1, wherein the first component service is stored in a first component and the second component service is stored in a second component, the first component distinct from the second component.

4. The computer program product of claim 1, wherein the first component service is stored in a first server and the second component service is stored in a second server, the first server distinct from the second server.

5. The computer program product of claim 1, wherein the computer readable program when executed on the computer further causes the computer to process the first service invocation at the first component service utilizing a first thread and process the second service invocation at the second component service utilizing a second thread, the first thread distinct from the second thread.

6. The computer program product of claim 1, wherein the computer readable program when executed on the computer further causes the computer to display the correlated first data, second data, and third data.

7. The computer program product of claim 1, wherein the computer readable program when executed on the computer further causes the computer to randomly generate the identifier.

8. The computer program product of claim 1, wherein the computer readable program when executed on the computer further causes the computer to process a plurality of events and record a unique event identifier for each event in the trace file.

9. The computer program product of claim 8, wherein correlating the first data and the second data is based on the unique event identifier.

10. The computer program product of claim 8, wherein the computer readable program when executed on the computer further causes the computer to randomly generate the unique event identifier.

11. The computer program product of claim 1, wherein the computer readable program is built on top of a Service Oriented Architecture.

12. A method comprising:
    configuring, using at least one processor of a computer, a calling interceptor at a first component service to monitor a first service invocation made by the first component service to a second component service, record first data represented by a first correlation indicator and an identifier into a trace file, and send the identifier to the second component service, wherein a callee interceptor at the second component service records second data represented by a second correlation indicator and the identifier into the trace file;
    configuring, using at least one processor of the computer, a callee interceptor at the first component service to monitor a second service invocation made by the second component service to the first component service and record third data represented by a third correlation indicator into the trace file; and
    correlating, using at least one processor of the computer, the first data, the second data, and the third data in the trace file based on the first correlation indicator, the second correlation indicator, the third correlation indicator, and the identifier.

13. The method of claim 12, wherein at least one of the first service invocation and the second service invocation is asynchronous.

14. The method of claim 12, wherein the first component service is stored in a first component and the second component service is stored in a second component, the first component distinct from the second component.

15. The method of claim 12, wherein the first component service is stored in a first server and the second component service is stored in a second server, the first server distinct from the second server.

16. The method of claim 12, further comprising processing the first service invocation at the first component service utilizing a first thread and processing the second service invocation at the second component service utilizing a second thread, the first thread distinct from the second thread.

17. The method of claim 12, further comprising displaying the correlated first data, second data, and third data.

18. A system comprising:
   a processor; and
   storage coupled to the processor, wherein the storage has stored thereon a computer readable program, and wherein the processor is configured to execute the computer readable program to perform:
   configuring a calling interceptor at a first component service to monitor a first service invocation made by the first component service to a second component service records first data represented by a first correlation indicator and an identifier into a trace file, and sends the identifier to the second component service, wherein a callee interceptor at the second component service records second data represented by a second correlation indicator and the identifier into the trace file;
   configuring a callee interceptor at the first component service to monitor a second service invocation made by the second component service to the first component service and record third data represented by a third correlation indicator into the trace file; and
   correlating the first data, the second data, and the third data in the trace file based on the first correlation indicator, the second correlation indicator, the third correlation indicator, and the identifier.

19. The system of claim 18, wherein at least one of the first service invocation and the second service invocation is asynchronous.

20. The system of claim 18, further comprising a display module that displays the correlated first data, second data, and third data.

* * * * *